(12) United States Patent
Kim

(10) Patent No.: US 8,079,063 B2
(45) Date of Patent: Dec. 13, 2011

(54) METHOD AND APPARATUS FOR CONTROLLING HOME NETWORK DEVICES USING RICH SITE SUMMARY SERVICE

(75) Inventor: Sun-bal Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1009 days.

(21) Appl. No.: 11/954,324

(22) Filed: Dec. 12, 2007

(65) Prior Publication Data

US 2008/0307509 A1 Dec. 11, 2008

(30) Foreign Application Priority Data

Jun. 11, 2007 (KR) .................. 10-2007-0056762

(51) Int. Cl.
   *G06F 21/24* (2006.01)
   *G06F 15/16* (2006.01)
(52) U.S. Cl. .................. 726/4; 726/1; 726/27
(58) Field of Classification Search .................. None
   See application file for complete search history.

(56) References Cited

U.S. PATENT DOCUMENTS

| | | | |
|---|---|---|---|
| 7,603,425 B2 * | 10/2009 | DiPlacido et al. | 709/206 |
| 7,698,744 B2 * | 4/2010 | Fanton et al. | 726/27 |
| 7,761,908 B2 * | 7/2010 | Yokoyama | 726/4 |
| 2006/0173985 A1 * | 8/2006 | Moore | 709/223 |
| 2007/0169168 A1 * | 7/2007 | Lim | 726/1 |
| 2007/0174298 A1 * | 7/2007 | Tanimoto | 707/10 |
| 2007/0258474 A1 * | 11/2007 | Kim et al. | 370/401 |
| 2008/0066150 A1 * | 3/2008 | Lim | 726/1 |
| 2008/0263240 A1 * | 10/2008 | Kori et al. | 710/58 |
| 2008/0281511 A1 * | 11/2008 | Miyata | 701/207 |
| 2008/0301685 A1 * | 12/2008 | Thomas et al. | 718/102 |
| 2008/0306972 A1 * | 12/2008 | Wilkin et al. | 707/100 |
| 2009/0195806 A1 * | 8/2009 | Ohashi | 358/1.13 |
| 2009/0316198 A1 * | 12/2009 | Takeuchi et al. | 358/1.15 |
| 2010/0082797 A1 * | 4/2010 | Nakamura | 709/223 |
| 2010/0153533 A1 * | 6/2010 | Chung | 709/223 |
| 2010/0250711 A1 * | 9/2010 | Nakamura | 709/219 |
| 2010/0299432 A1 * | 11/2010 | Emanuel et al. | 709/224 |
| 2011/0051718 A1 * | 3/2011 | Sharp | 370/352 |
| 2011/0111773 A1 * | 5/2011 | Lee et al. | 455/456.3 |

FOREIGN PATENT DOCUMENTS

KR 10-2007-0008478 A 1/2007

OTHER PUBLICATIONS

Fairon, "Corporator: a tool for creating RSS-based specialized corpora", Apr. 2006, WAC '06: Proceedings of the 2nd International Workshop on Web as Corpus, p. 43-50.*

* cited by examiner

*Primary Examiner* — Christopher Revak
(74) *Attorney, Agent, or Firm* — Sughrue Mion, PLLC

(57) ABSTRACT

A method of controlling at least one home network device, in which a home network periodically connects to a rich site summary (RSS) server, fetches a control command for the at least one home network device, and controls the at least one home network device on the basis of the fetched control command.

29 Claims, 3 Drawing Sheets

FIG. 3

```
<rss version="2.0">
<channel>
<title> Remote Control </title>
<description> ... </description>
<pubDate>Tue, 10 Jun 2007 04:00:00 GMT</pubDate>
<lastBuildDate>Tue, 10 Jun 2007 09:41:01 GMT</lastBuildDate>
...
<item>
<description>                                                    ⌐310
  <Order id="1">
  <Command> Record </Command>
  <Commander> park </Commander>
  <TargetDevice> IPTV </TargetDevice>
  <RegisterTime> Tue, 10 Jun 2007 04:00:00 GMT <RegisterTime>
  <Optional_Information>
  ...
  </Optional_Information>
  </Order>
  <DS> E_k[order] </DS>
</description>
</item>
<item>
<description>                                                    ⌐320
  <Order id="2">
  <Command> Report </Command>
  <Commander> park </Commander>
  <TargetDevice> Phone </TargetDevice>
  <RegisterTime> Tue, 10 Jun 2007 04:00:00 GMT <RegisterTime>
  <Optional_Information>
  <StartTime> 09:00 </StartTime>
  <EndTime> 22:00 </EndTime>
  <ReportAddress type="email">someone@samsung.com</ReportAddress>
  </Optional_Information>
  </Order>
  <DS> E_k[order] </DS>
</description>
</item>
</channel>
</rss>
```

METHOD AND APPARATUS FOR CONTROLLING HOME NETWORK DEVICES USING RICH SITE SUMMARY SERVICE

CROSS-REFERENCE TO RELATED PATENT APPLICATION

This application claims priority from Korean Patent Application No. 10-2007-0056762, filed on Jun. 11, 2007, in the Korean Intellectual Property Office, the disclosure of which is incorporated herein by reference in its entirety.

BACKGROUND OF THE INVENTION

1. Field of the Invention

Apparatuses and methods consistent with the present invention related to controlling a home network device, and more particularly, to controlling at least one home network device by using a rich site summary (RSS) service.

2. Description of the Related Art

A home network is a physical network technology in which all electric and electronic products, used in the home are connected to one another through a single wired and/or wireless system and thus can be controlled regardless of time and place. A home network also performs automatic control functions such as exchanging information, monitoring, providing security, and remotely controlling home appliances. FIG. 1 is a block diagram for explaining a conventional method of controlling a home network device.

Referring to FIG. 1, a terminal 110, a remote control server 120, and a home network 130 are connected to one another via the Internet.

First, when a user logs into the remote control server 120 by using the terminal 110, the remote control server 120 analyzes log-in information in order to determine whether the user has been authorized to control home network devices. Examples of the terminal 110 include a mobile phone, a personal computer (PC), a personal data assistant (PDA), etc.

When it is determined by the remote control server 120 that the user has authorization to control home network devices included in the home network 130, the user is able to transmit a control command for controlling the home network devices to the remote control server 120.

The terminal 110 transmits the control command to the remote control server 120, which then transmits the control command to the home network 130.

The home network 130 controls the home network devices according to the control command received from the remote control server 120.

A protocol is defined when the control command is transmitted between the terminal 110, the remote control server 120, and the home network 130. The control command is transmitted and received according to the protocol. As described above, in related art, when a control command for achieving home network control is transmitted, a protocol should be necessarily defined, and the control command should be transmitted according to the protocol.

SUMMARY OF THE INVENTION

The present invention provides a method and apparatus for remotely controlling home network devices without defining a special protocol.

According to an aspect of the present invention, there is provided a method of controlling at least one home network device by using a rich site summary (RSS) service, the method comprising periodically connecting to an RSS server and fetching a control command for the at least one home network device; and controlling the at least one home network device on the basis of the fetched control command.

The controlling of the at least one home network device may include analyzing the control command; and controlling the at least one home network device according to the analysis result.

The analyzing of the control command may further include specifying at least one home network device to be controlled according to the control command; and analyzing an operation to be performed by the specified home network device.

In the analyzing of the control command, it is determined whether the control command is a control command to be executed by the home network device.

The method of controlling at least one home network device by using an RSS service may further include reporting a message to a user indicating that the at least one home network device has been controlled, according to the control command.

In the reporting of the message, the message may be transmitted to a predetermined Internet address or an e-mail address.

In the reporting of the message, the message may be transmitted to a predetermined terminal.

The control command may be registered in the RSS server by using a terminal of a user who is authorized to control the at least one home network device.

The method of controlling at least one home network device by using an RSS service may further include authenticating whether the control command is a command registered by a user who is authorized to control the at least one home network device, wherein the controlling of the at least one home network device is performed only when it is authenticated that the control command is a command registered by the authorized user.

The control command may further include an electronic signature of a person who registered the control command in the RSS server. The authenticating may be performed using the electronic signature.

The control command may be structured in an Extensible Markup Language (XML) format.

According to another aspect of the present invention, there is provided an apparatus which controls at least one home network device by using an RSS service, the apparatus comprising a command fetch unit periodically connecting to an RSS server and fetching a control command for at least one home network device; and a control unit controlling the home network device on the basis of the fetched control command.

The apparatus which controls at least one home network device by using the RSS service may further include a reporting unit reporting a message to a user indicating that the at least one home network device has been controlled according to the control command.

The apparatus which controls at least one home network device by using an RSS service may further include an authentication unit which authenticates whether the control command is a command registered by a user authorized to control the at least one home network device. The control unit may control the at least one home network device only when the authentication unit authenticates that the control command is a command registered by the authorized user.

According to another aspect of the present invention, there is provided a computer-readable recording medium having recorded therein a method of controlling at least one home network device by using an RSS service, the method including periodically connecting to the RSS server and fetching a control command for the at least one home network device;

and controlling the at least one home network device on the basis of the fetched control command.

BRIEF DESCRIPTION OF THE DRAWINGS

The above and other aspects of the present invention will become more apparent by describing certain exemplary embodiments of the present invention with reference to the accompanying drawings, in which:

FIG. 3 illustrates a control command according to an exemplary embodiment of the present invention;

DETAILED DESCRIPTION OF THE INVENTION

Certain exemplary embodiments of the present invention will now be described in greater detail with reference to the accompanying drawings.

Figure 1:
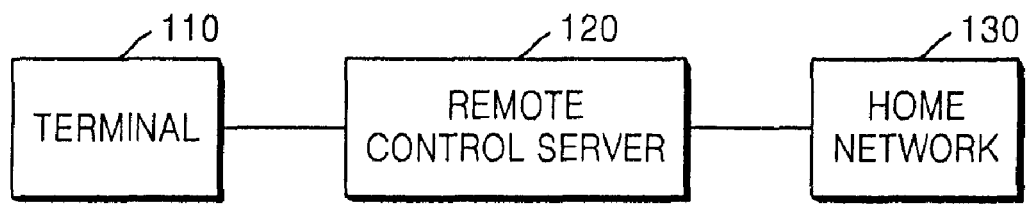
FIG. 1 is a block diagram illustrating a related method of controlling home network devices.
Figure 2:
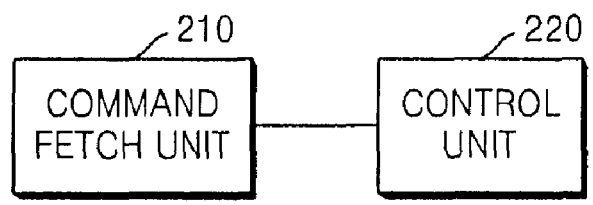
FIG. 2 is a block diagram illustrating an apparatus which controls home network devices, according to an exemplary embodiment of the present invention.

FIG. 2 is a block diagram of an apparatus which controls home network devices according to an exemplary embodiment of the present invention. Referring to FIG. 2, the home network device controlling apparatus includes a command fetch unit 210 and a control unit 220.

The command fetch unit 210 periodically connects to a rich site summary (RSS) server in order to fetch a command to control at least one home network device.

RSS is an abbreviation of Resource Description Framework (RDF) Site Summary, Rich Site Summary, or the like, and denotes a service provided by a website which frequently performs a content update, such as news or blogs. The service also automatically provides updated information to users. In the home network device controlling apparatus according to the exemplary embodiment illustrated in FIG. 2, as described above, a control command for home network devices is fetched by using the existing RSS service, and thus a protocol used in the existing RSS service can be used. Therefore, the home network device controlling apparatus according to the embodiment illustrated in FIG. 2 can control home network devices without defining a special protocol that is conventionally needed to transmit a control command.

The control command may include a variety of commands, such as a scheduled recording command for televisions (TVs), a Video on demand (VOD) download command for PCs, a command for telephones to check messages during absence, etc. This control command is registered in an RSS server by using a terminal of a user who is authorized to control the at least one home network device. In other words, when the RSS server registers the control command, the RSS determines whether the user trying to register the control command has been authorized, and registers the control command if it is determined that the user has been authorized. The control unit 220 controls the at least one home network device according to the control command fetched by the command fetch unit 210.

FIG. 3 illustrates a control command according to an exemplary embodiment of the present invention.

Referring to FIG. 3, the RSS control command is in an XML format. The control unit 220 may analyze the RSS control command and control the at least one home network device according to a result of the analysis.

A command 310 sequentially states that the ID is 1, the type is a record, Mr. Park is the person who registered the command 310, that an Internet Protocol Television (IPTV) is a device that performs the command 310, and that the command 310 was registered on Tuesday, 10 Jun. 2007.

The last line of the command 310 is an electronic signature created by encrypting all of the commands in the command 310 with Mr. Park's secret key. The electronic signature is included in the control command in order to authenticate whether Mr. Park has been authorized to control home network devices.

When a decryption of the encrypted electronic signature is identical with the commands included in the command 310, it may be determined that the commands included in the command 310 have been registered by an authorized user.

As described above, the control unit 220 controls home network devices according to a control command only when it is determined that the control command has been registered by an authorized user. In the above, an authentication method that uses an electronic signature is described. However, other authentication methods can be used as long as the authentication method determines whether an authorized user has registered the control command.

Preferably, the home network device controlling apparatus according to the exemplary embodiment illustrated in FIG. 2 may further include an authentication unit (not shown) for authenticating whether an authorized user has registered the control command.

In another exemplary embodiment of the present invention, a message can be sent to the user when an IPTV starts or concludes recording predetermined contents according to the control command. This message may be transmitted to a predetermined Internet address, an e-mail address, or a terminal.

The home network device controlling apparatus according to the exemplary embodiment illustrated in FIG. 2 may further include a reporting unit (not shown), which reports to the user when at least one home network device has been controlled according to a control command.

A command 320 sequentially states that the ID is 2, the type is a record, Mr. Park is the person who registered the command 320, that a telephone is a device that performs the command 320, and that the command 320 was registered on Tuesday, 10 Jun. 2007.

In contrast to the command 310, the command 320 includes optional information. The optional information included in the command 320 indicates that calls received between 9:00 and 22:00 will be emailed to someone@samsung.com. As described above, the optional information includes detailed information about an operation to be performed by a home network device.

An electronic signature stated in the last line of the command 320 has the same function as that included in the command 310, so a detailed description thereof is omitted.

Figure 4:
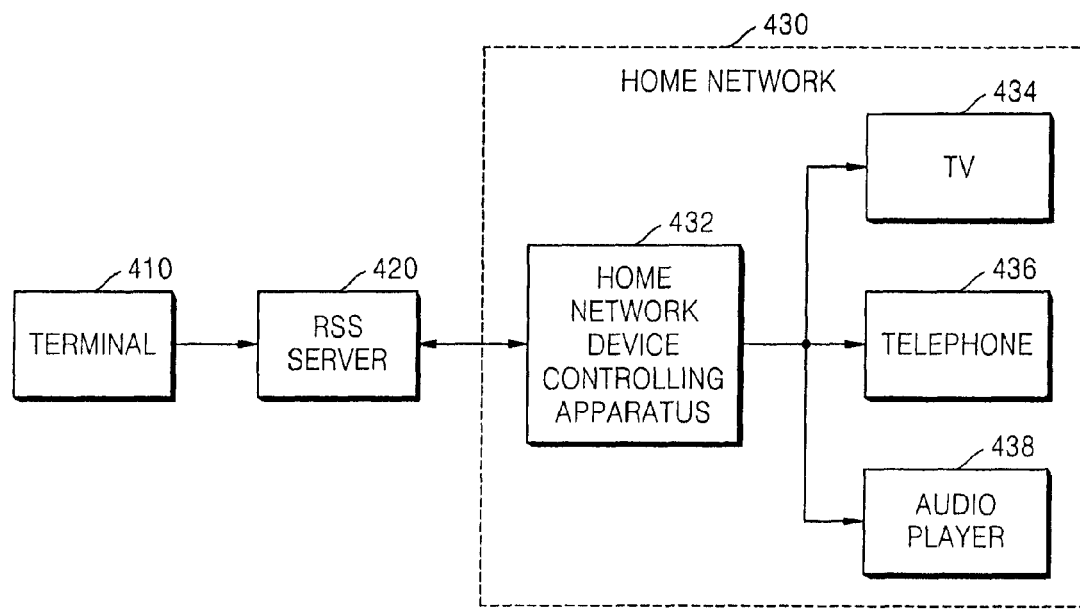
FIG. 4 is a block diagram illustrating a system and a method of controlling home network devices, according to an exemplary embodiment of the present invention.

FIG. 4 is a block diagram for illustrating a system and a method of controlling home network devices, according to an exemplary embodiment of the present invention.

Referring to FIG. 4, a home network 430 may contain home network devices such as a TV 434, a telephone 436, and an audio player 438, which are connected to a home network device controlling apparatus 432 according to an exemplary embodiment of the present invention.

Referring to FIG. 4, in the home network device controlling method, a user utilizes a terminal 410 to register a control command in an RSS server 420. In addition, the home network device controlling apparatus 432 periodically connects to the RSS server 420 in order to fetch a control command.

Finally, the home network device controlling apparatus 432 analyzes the fetched control command, specifies at least one home network device according to the control command, and then determines an operation to be performed by the specified home network device.

For example, if the control command indicates that the TV 434 is to record predetermined contents, the home network device controlling apparatus 432 specifies that a home network device to be controlled according to the control command is the TV 434 and that an operation to be performed by the TV 434 is to record contents, and commands the TV 434 to record the contents according to the created specification.

Figure 5:
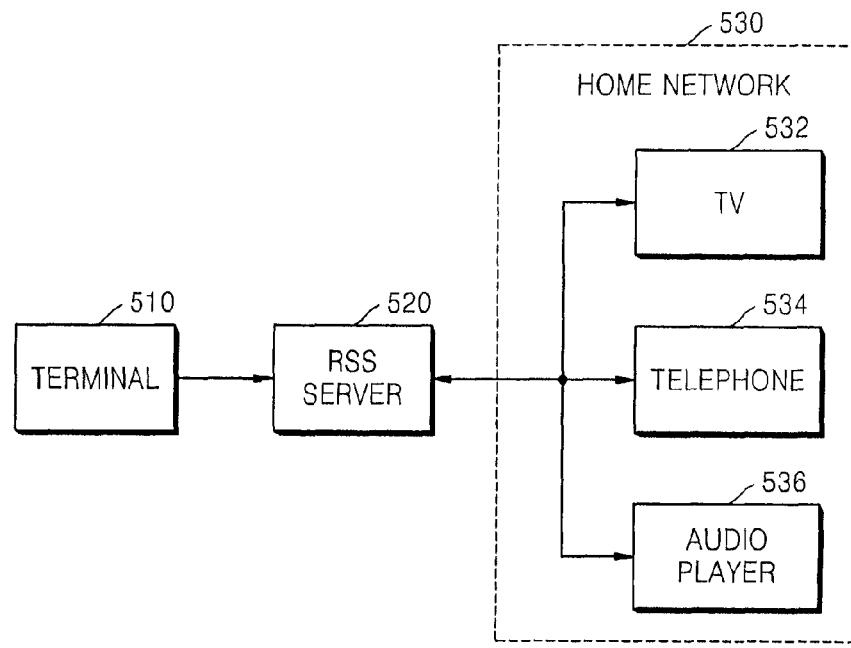
FIG. 5 is a block diagram illustrating a system and a method of controlling home network devices, according to another exemplary embodiment of the present invention.

FIG. 5 is a block diagram illustrating a system and a method of controlling home network devices, according to another exemplary embodiment of the present invention.

Referring to FIG. 5, a home network 530 includes home network devices such as a TV 532, a telephone 534, and an audio player 536. Each of the TV 532, the telephone 534, and the audio player 536 includes a home network device controlling apparatus according to the present invention.

In other words, in contrast to the home network device controlling method illustrated in FIG. 4, each of the TV 532, the telephone 534, and the audio player 536 connects to an RSS server 520, fetches a control command, and analyzes the fetched control command in order to determine whether the fetched control command is a control command to be performed by the TV 532, the telephone 534, or the audio player 536. According to a result of the analysis, an operation is performed or not.

For example, if the control command instructs the TV 532 to record predetermined contents, each of the TV 532, the telephone 534, and the audio player 536 fetches the same control command. Each of the TV 532, the telephone 534, and the audio player 536 then analyzes whether the fetched control command is intended for itself. In this case, since the control command is for the TV 532, the TV 532 performs a contents recording operation according to the control command, whereas the telephone 534 and the audio player 536 do not perform any operation.

In a home network device controlling method according to the present invention, a home network is periodically connected to an RSS server in order to fetch a control command for at least one home network device. The at least one home network device is controlled by the fetched control command. Therefore, the at least one home network device can be remotely controlled without defining a special protocol.

The exemplary embodiments of the present invention can be written as computer programs and implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling at least one home network device by using a rich site summary (RSS) service, the method comprising:
   registering a control command, received from a user terminal, in an RSS server;
   periodically connecting to the RSS server and fetching the control command from the RSS server by a controlling unit for the at least one home network device; and
   controlling the at least one home network device by the controlling unit based on the fetched control command.

2. The method of claim 1, wherein the controlling of the at least one home network device comprises:
   analyzing the control command by the controlling unit to generate an analysis result; and
   controlling the at least one home network device according to the analysis result.

3. The method of claim 2, wherein the analyzing of the control command comprises:
   specifying the at least one home network device to be controlled according to the control command; and
   analyzing an operation to be performed by the specified home network device.

4. The method of claim 2, wherein in the analyzing of the control command comprises determining whether the control command is a control command to be executed by the at least one home network device.

5. The method of claim 1, further comprising reporting a message by the controlling unit to a user terminal indicating that the at least one home network device has been controlled, according to the control command.

6. The method of claim 5, wherein the reporting of the message includes transmitting the message to a predetermined Internet address or an e-mail address.

7. The method of claim 5, wherein the reporting of the message includes transmitting the message to a predetermined terminal.

8. The method of claim 1, wherein the control command is registered in the RSS server by using the user terminal of a user who is authorized to control the at least one home network device.

9. The method of claim 1, further comprising determining whether the control command is a command registered by an authorized user who is authorized to control the at least one home network device,
   wherein the controlling of the at least one home network device is performed if it is authenticated that the control command is the command registered by the authorized user.

10. The method of claim 9, wherein:
    the control command further comprises an electronic signature of a person who registered the control command in the RSS server; and
    the determining whether the control command is the command registered by the authorized user is performed using the electronic signature.

11. The method of claim 1, wherein the control command is structured in an Extensible Markup Language (XML) format.

12. A non-transitory computer readable medium having embodied thereon a computer program for executing the method of claim 1.

13. The method of claim 1, wherein the controlling unit, the RSS server and the user terminal are separate and distinct devices.

14. The method of claim 1, wherein the controlling unit and the at least one home network device are located in a home network, and the RSS server and the user terminal are located external to the home network.

15. An apparatus for controlling at least one home network device by using a rich site summary (RSS) service, the apparatus comprising:
a command fetch unit which periodically connects to an RSS server and fetches a control command from the RSS server for at least one home network device; and
a control unit which controls the at least one home network device based on the fetched control command,
wherein the control command is received by the RSS server from a user terminal and is registered in the RSS server.

16. The apparatus of claim 15, wherein the control unit analyzes the control command to generate a result and controls the at least one home network device based on the result.

17. The apparatus of claim 16, wherein the control unit specifies at least one home network device to be controlled according to the control command, analyzes an operation to be performed by the specified home network device, and controls the at least one home network device on the basis of a result of the analysis.

18. The apparatus of claim 16, wherein the control unit analyzes the control command and determines whether the control command is a control command to be executed by the at least one home network device, and selectively controls the at least one home network device on the basis of a result of the analysis.

19. The apparatus of claim 15, further comprising a reporting unit which reports a message to the user terminal indicating that the at least one home network device has been controlled according to the control command.

20. The apparatus of claim 19, wherein the reporting unit transmits the message to a predetermined Internet address or an e-mail address.

21. The apparatus of claim 19, wherein the reporting unit transmits the message to a predetermined terminal.

22. The apparatus of claim 15, wherein the control command is registered in the RSS server by using the user terminal of a user who is authorized to control the at least one home network device.

23. The apparatus of claim 15, further comprising an authentication unit which determines whether the control command is a command registered by an authorized user authorized to control the at least one home network device, wherein the control unit controls the at least one home network device if the authentication unit determines that the control command is the command registered by the authorized user.

24. The apparatus of claim 23, wherein:
the control command further comprises an electronic signature of a person who registered the control command in the RSS server; and
the authentication unit determines whether the control command is the command registered by the authorized user using the electronic signature.

25. The apparatus of claim 15, wherein the control command is structured in an Extensible Markup Language (XML) format.

26. The apparatus of claim 15, wherein the controlling unit, the RSS server and the user terminal are separate and distinct devices.

27. The apparatus of claim 15, wherein the apparatus and the at least one home network device are located in a home network, and the RSS server and the user terminal are located external to the home network.

28. A system which controls a plurality of home network devices, the system comprising:
a user terminal which transmits a control command input at the user terminal;
a rich site summary (RSS) server which receives the control command from the user terminal and registers the control command therein;
the plurality of home network devices; and
a plurality of controlling units, wherein each of the plurality of controlling units comprise a command fetch unit which periodically connects to the RSS server and fetches the control command from the RSS server, and a control unit which controls one of the plurality of home network devices based on the fetched control command,
wherein each of the plurality of home network devices comprise a different controlling unit of the plurality of controlling units.

29. The system of claim 28, wherein each of the plurality controlling units fetches the control command, analyzes whether the fetched control command is intended to control a corresponding home network device of the plurality of home network devices, and controls the corresponding home network device to perform a command operation if the control command is intended for the corresponding home network device.

* * * * *